United States Patent [19]

Mitani et al.

[11] Patent Number: 5,077,507

[45] Date of Patent: Dec. 31, 1991

[54] SERVO CONTROL APPARATUS

[75] Inventors: Akira Mitani; Mitsuyasu Kachi, both of Aichi, Japan

[73] Assignee: Mitsubishi Denki K.K., Tokyo, Japan

[21] Appl. No.: 535,681

[22] Filed: Jun. 11, 1990

[30] Foreign Application Priority Data

Jun. 29, 1989 [JP] Japan .................................. 1-165322
Aug. 10, 1989 [JP] Japan .................................. 1-205732

[51] Int. Cl.[5] .......................................... G05B 19/18
[52] U.S. Cl. .................................... 318/569; 318/571; 318/490; 364/474.04
[58] Field of Search ............... 318/569, 571, 490, 463; 364/474.04

[56] References Cited

U.S. PATENT DOCUMENTS 4,275,342 6/1981 Kawada et al. ..................... 318/490
4,392,195 7/1983 Inoue .............................. 318/571 X Primary Examiner—William M. Shoop, Jr.
Assistant Examiner—Saul M. Bergmann
Attorney, Agent, or Firm—Sughrue, Mion, Zinn, Macpeak & Seas

[57] ABSTRACT

A servo control apparatus comprises an abnormality detection circuit which calculates a difference between the quantity of rotation of a servo motor from a reference point calculated on the basis of an accumulated value of the position feedback and the quantity of rotation of the servo motor from the reference point counted by a rotational detector, and puts out an absolute position abnormality signal when the calculated difference value exceeds a predetermined value.

6 Claims, 6 Drawing Sheets

FREERUN COUNTER 7 → TIME

CYCLE COUNTER 8 → TIME

Z-PHASE PULSE → TIME

REVOLVING NUMBER COUNTER 10 → TIME

SERVO CONTROL APPARATUS

FIELD OF THE INVENTION

The present invention generally relates to a servo control apparatus of, for example, an NC machine tool or the like, and particularly relates to a servo control apparatus of such an NC machine tool, in which abnormality of a position detection system thereof is detected to thereby prevent a maloperation form from occurring.

BACKGROUND OF THE INVENTION

In a servo control apparatus for performing position control, conventionally, such a servo loop, for example, as shown in FIG. 1 has been provided. In the drawing, the servo control apparatus is constituted by: a command decode circuit 1 which serves to decode a command supplied from a numerical control system (not shown) to the servo control apparatus to thereby obtain a speed, a quantity of displacement pulse, and the like; a pulse distribution circuit 2 which serves to generate a predetermined command pulse on the basis of the output of the command decode circuit 1; a position control circuit 3 which serves to perform position control so as to make any difference between the command pulse and a position feedback signal equal to zero; a speed control circuit 4 which serves to control the speed in accordance with the speed command from the position control circuit 3; a servo motor 5; a position detector 6 which serves to detect the rotational position of the servo motor 5; a free run counter 7 which has a function of an up/down counter for counting a feedback pulse from the position detector 6 in the positive and negative directions; a subtraction circuit 7a which serves to obtain the difference between the current and the preceding output count values of the free run counter 7; and a cycle counter 8 which is constituted by an up/down counter similar to the free run counter 7 but is preset by a Z-phase pulse, that is, a reference pulse produced from the position detector 6 at a reference position in every rotation.

Next, the operation of the servo loop will be described. The command decode circuit 1 decodes a command supplied to the servo control apparatus to thereby produce a speed, a quantity of displacement pulse, and the like. The pulse distribution circuit 2 produces, as a position command, a quantity of displacement pulse per predetermined unit time on the basis of the speed, the quantity of displacement pulse, and the like obtained in the command decode circuit 1. The position control circuit 3 produces a speed command so that the servo motor 5 is driven through the speed control circuit 4 so as to make the difference between the position command and a position feedback equal to zero. The position detector 6 is connected to the servo motor 5 so as to produce a feedback pulse corresponding to the rotational angular position and direction of the servo motor 5. The free run counter 7 counts the feedback pulse and the subtraction circuit 7a feeds back a difference between current and preceding count values of the free run counter 7 to the position control circuit 3 as the quantity of displacement pulse per unit time of the servo motor 5. Further, the cycle counter 8 counts the feedback pulse supplied from the position detector 6 similarly to the free run counter 7. The cycle counter 8 is preset by the Z-phase pulse supplied from the position detector 6 so that the cycle counter 8 detects a reference point return which the position control circuit 3 performs to set the system of coordinates upon turning-on of a power source and magnetic pole positions of the servo motor 5 when the servo motor 5 is an AC induction motor, the output of the cycle counter 8 being feedback to the pulse distribution circuit 2.

Being configured as described above, the conventional position control system has a problem in that if the feedback pulse from the position detector 6 is erroneously counted, it becomes impossible to perform positioning to a commanded position correctly, for example, in an NC machine tool or the like.

As an example of application of the above servo loop, there has been known such a conventional servo control apparatus as FIG. 2 which performs position control, for example, of a tool or a work table in an NC machine tool or the like.

In FIG. 2, the circuit configuration includes: a command decode circuit 1 which serves to decode a displacement command supplied to the servo control apparatus to thereby obtain a speed, a quantity of displacement, and the like; a pulse distribution circuit 2 which serves to produce, as a command pulse, a quantity of displacement pulse per unit time on the basis of the speed and the quantity of displacement produced from the command decode circuit 1; a position control circuit 3 which serves to produce a speed command so that the difference between the command pulse produced from the pulse distribution circuit 2 and a position feedback is made equal to zero; a speed control circuit 4 which serves to control the revolving speed of a servo motor 5 in accordance with the speed command from the position control circuit 3; a position detector 6a which serves to detect a current rotational position of the servo motor 5 and to output the current rotational position as a feedback pulse; a revolving number detector 6b which serves to detect the current revolving number of the servo motor 5; and an angle detector 6c which serves to detect the current angle of the servo motor 5 in every rotation, the angle detector 6c constituting, together with the position detector 6a and the revolving number detector 6b, an absolute position detector for the servo motor 5.

The circuit configuration further includes: a free run counter 7 constituted by an up/down counter which serves to count the output pulse of the position detector 6a; a feedback pulse generation circuit 7a which serves to generate a position feedback pulse on the basis of the output of the free run counter 7; and a revolving number counter 10 constituted by an up/down counter which serves to count the output pulse of the revolving number detector 6b.

The circuit configuration further includes a reference revolving number memory 11 which serves to store in advance the count value of the revolving number counter 10 produced at a reference point in accordance with a reference point storage command supplied from the command decode circuit 1; a reference angle memory 12 which serves to store in advance the output of the angle detector 6c produced at the reference point in accordance with the same reference point storage command; and a back-up battery 13 which serves to hold the respective output values of the revolving number counter 10, the reference revolving number memory, and the reference angle memory 12 upon turning-off of the power supply.

The circuit configuration further includes an absolute position detection circuit 14 which serves to obtain the current absolute position of the servo motor 5 on the basis of the respective outputs of the reference revolving number memory 11, the revolving number counter 10, the reference angle memory 12, and the angle detector 6c.

Next, the operation of the thus configured servo control apparatus will be described. A command applied from an NC tape or the like to the servo control apparatus is decoded by the command decode circuit 1 so that a speed, a quantity of displacement, and the like are obtained. The speed, the quantity of displacement, and the like are supplied to the pulse distribution circuit 2. The pulse distribution circuit 2 calculates a quantity of displacement pulse per predetermined unit time, and supplies the thus obtained quantity of displacement pulse, as a position command pulse, to the position control circuit 3. The position control circuit 3 calculates a speed command so as to make the difference between the applied position command pulse and a position feedback pulse equal to zero, and supplies the thus obtained speed command to the speed control circuit 4. The speed control circuit 4 drives the servo motor 5 in accordance with the speed command supplied thereto.

The position detector 6a connected to the servo motor 5 produces a pulse corresponding to the current rotational direction and angle of the servo motor 5. The free run counter 7 counts the pulse supplied from the position detector 6a. The feedback pulse generation circuit 7a calculates a difference between the current count value of the free run counter 7 and the accumulated count value of the free run counter 7 till the current count value of the same. The difference is supplied to the position control circuit 3 as a position feedback pulse per unit time of the servo motor 5.

In such a control system, it is necessary to establish the system of coordinates in order to detect the rotational position of the servo motor 5 to thereby control the servo motor 5. Then, description will be made hereunder as to the operation in determining the system of coordinates.

The revolving number detector 6b produces, in every rotation of the servo motor 5, a revolving pulse corresponding to the current revolving, that is, the current revolving number and direction of the servo motor 5 and supplies the produced revolving pulse to the revolving number counter 10 so that the revolving number counter 10 counts the current revolving number of the servo motor 5. The angle detector 6c detects the current angle of the servo motor 5 in every rotation.

Further, the reference revolving number memory 11 and the reference angle memory 12 store, in advance, the count value and the angle value which are produced from the revolving number counter 10 and the angle detector 6c, respectively, at the reference point in accordance with a reference point storage command supplied from the command decode circuit 1.

Then, the current count value representing the current of revolving number of the servo motor 5 produced from the revolving number counter 10, the reference revolving number of the same at the reference point stored in advance in the reference revolving number memory 11, the current angle value detected by the angle detector 6c, and the reference angle value at the reference point stored in advance in the reference angle memory 12 are supplied to the absolute position detection circuit 14.

The absolute position detection circuit 14 calculates a difference between the current revolving number of the servo motor 5 produced from the revolving number counter 10 and the reference revolving number of the same at the reference point stored in advance in the reference revolving number memory 11 to thereby obtain the quantity of rotation of the servo motor 5 from the reference point. Further, the absolute position detection circuit 14 calculates a difference between the current angle in every rotation of the servo motor 5 produced from the angle detector 6c and the reference angle of the same at the reference point stored in advance in the reference angle memory 12 to thereby obtain the necessary quantity of angle of the servo motor 5 from the reference point. Then, the absolute position detection circuit 14 adds the thus obtained angle to the foregoing quantity of rotation of the servo motor 5 to thereby detect the absolute position of the servo motor 5. The absolute position is detected first upon turning on the power source of the servo control apparatus and the detected absolute position is made to be the system of coordinates of the command decode circuit 1. Thereafter, position control of the servo motor 5 is quickly performed on the basis of the system of coordinates.

Being configured as described above, the conventional servo control apparatus has a problem in that, although the system of coordinate of the command decode circuit 1 can be established immediately as soon as the power source of the servo control apparatus is turned on, it is impossible to confirm an error in the output pulse of the revolving number detector 6b, in the counting of the revolving number counter 10, or the like, so that the absolute position may shift thereby making it impossible to control the servo motor 5 to a correct position in the case where an error occurs in the output pulse of the revolving number detector 6b or in the counting of the revolving number counter 10.

SUMMARY OF THE INVENTION

It is therefore an object of the present invention to solve the foregoing problems in the prior art.

It is another object of the present invention to provide a servo control apparatus in which upon occurrence of a counting error in a feedback pulse from a position detector, the abnormality is detected and outputted at that point of time to thereby prevent maloperation from occurring.

It is another object of the present invention to provide a servo control apparatus in which upon occurrence of an error in an output pulse of a revolving number counter or in counting of the revolving number counter, absolute position abnormality information is outputted to thereby prevent maloperation from occurring thereafter.

In order to attain the above objects, according to an aspect of the present invention, the servo control apparatus is provided with a latch counter for latching a free run counter in accordance with a reference pulse supplied from a position detector and an abnormality detection circuit for comparing at each time the reference pulse is supplied, the absolute value of a difference between the current and the preceding values of the reference pulse with a value which is equal to zero or equal to the number of pulses per rotation of the position detector. The abnormality detection circuit outputs a detection abnormality signal when the difference between the compared values exceeds a predetermined permissible range.

According to another aspect of the present invention, the servo control apparatus is provided with an abnormality detection circuit which calculates a difference between first and second values each representing the quantity of rotation of a servo motor from a reference point. The first value is calculated on the basis of an accumulated value of the quantity of position feedback and the total quantity of pulses per rotation of a position detector. The second value is calculated from the count of the rotational detector. The abnormality detection circuit outputs an absolute position abnormality signal when the calculated difference between the first and second values exceeds a predetermined value.

Since the abnormality detection circuit according to the present invention executes a judgement comparison of the absolute value of a difference between current and preceding values of the latch counter with a predetermined value every time the reference pulse is generated, a maloperation such as erroneous counting or the like in the detection portion can be detected immediately.

Further, according to the present invention, the quantity of revolution of the servo motor from the reference point which is counted by the rotation detector is compared with the quantity of revolution of the same, which is calculated from an accumulated value of the quantity of position feedback obtained from a position detector, and when both the corresponding quantities of revolution are displaced from each other beyond a predetermined permissible range, this state is determined to be absolute position detection abnormality so that the operation of the servo control apparatus is stopped.

DETAILED DESCRIPTION OF THE PREFERRED EMBODIMENTS

Figure 1:
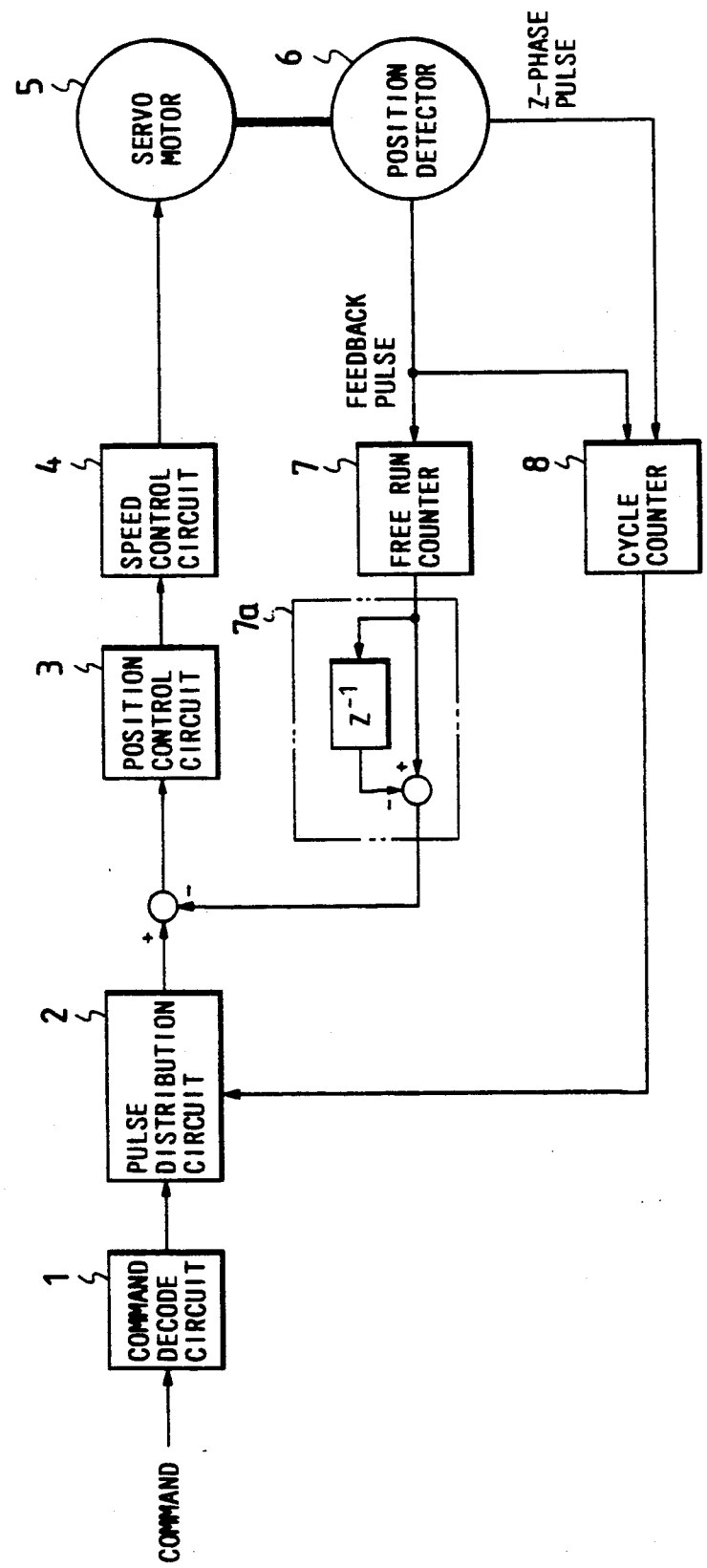
FIGS. 1 and 2 are block diagrams showing the conventional servo control apparatus.

Now, referring to the drawings, the preferred embodiments of the present invention will be described hereunder.

Figure 2:
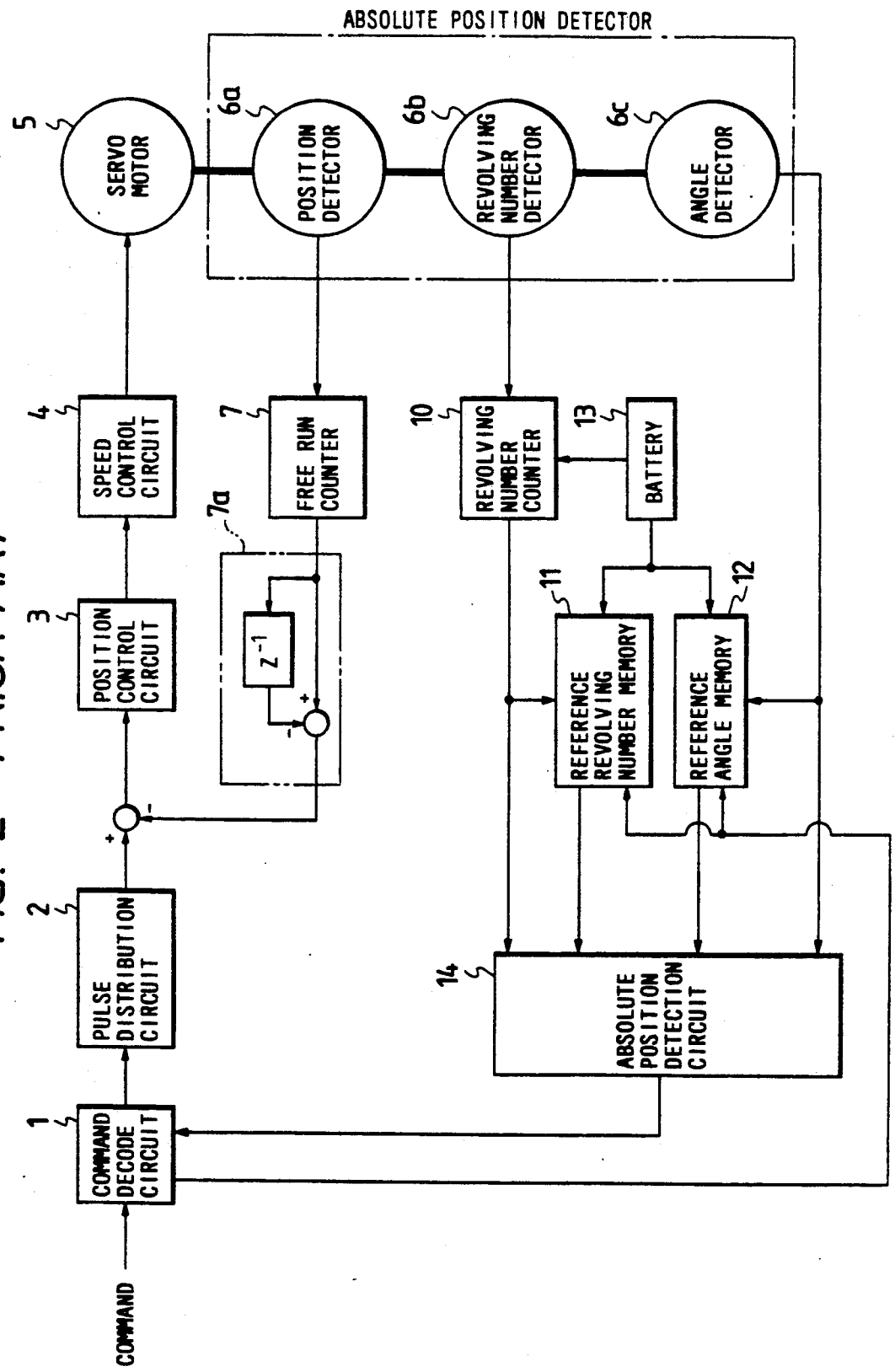
Figure 3:
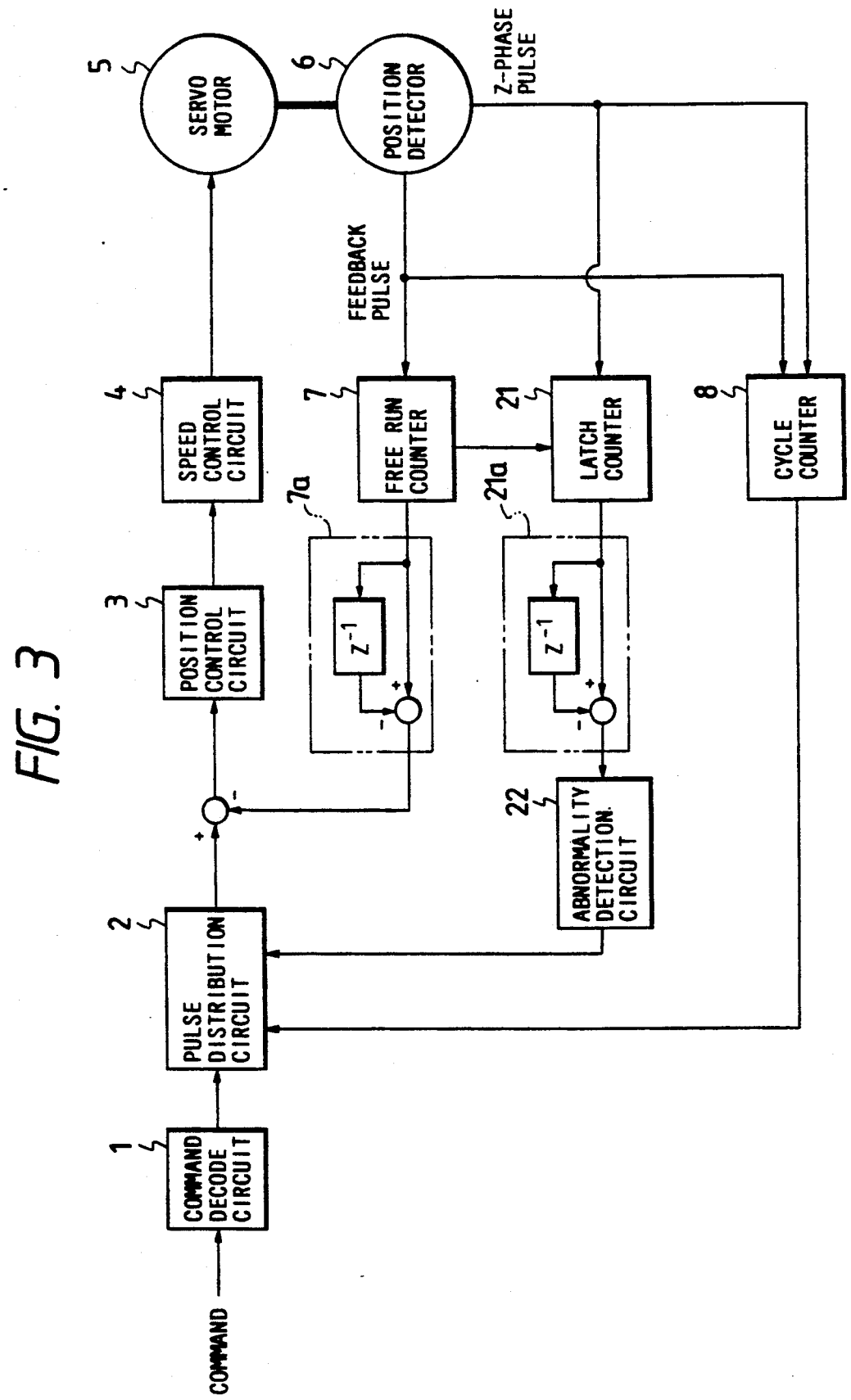
FIG. 3 is a block diagram showing an embodiment of the servo control apparatus according to the present invention.
Figure 6A:
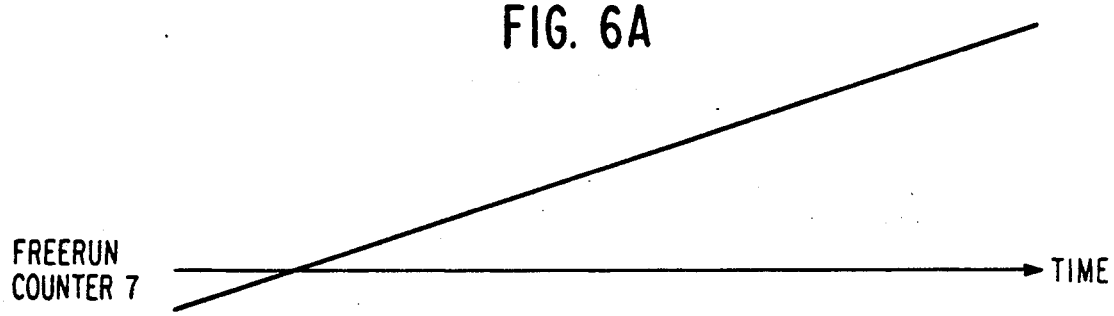
FIGS. 6A-6C are timing diagrams for various elements of FIG. 3.
Figure 6B:
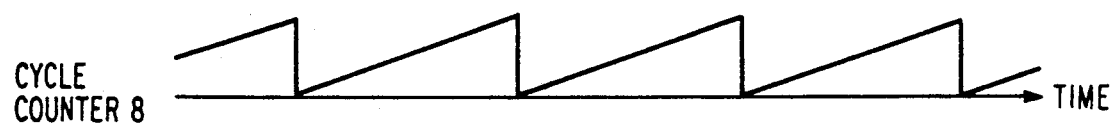
Figure 6C:
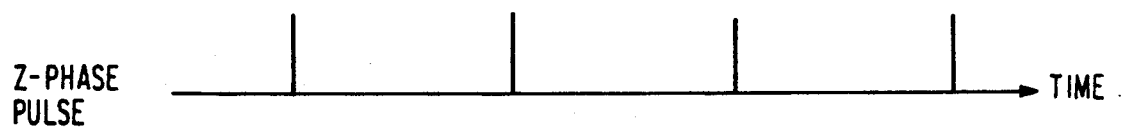

FIG. 3 is a diagram showing a control loop of a first embodiment of the servo control apparatus according to the present invention. In FIG. 3, the items designated by the reference numerals 1 through 8 are the same as those designated by the same reference numerals in the foregoing conventional apparatus shown in FIGS. 1 and 2. In addition to those elements 1 through 8, as shown in FIG. 3, the apparatus includes: a latch counter 21 which serves to latch the free run counter 7 in accordance with a Z-phase pulse produced from the position detector 6; (FIG. 6C shows the outputs of the Z-phase pulses) a subtraction circuit 21a which serves to produce an output representing a difference between the current and the preceding latched values of the latch counter 21; and an abnormality detection circuit 22 which serves to judge whether or not a difference between the output of subtraction circuit 21a and the number of pulses per rotation of the servo motor 5 detected by the position detector 6 is within a predetermined permissible range. The abnormality detection circuit 22 produces a detection abnormality signal if it is determined that the difference exceeds the predetermined permissible range.

Next, the operation of the thus configured servo control apparatus will be described. In accordance with a Z-phase pulse (reference pulse) produced from the position detector 6, the latch counter 21 latches the value of the free run counter 7 at the point of time upon input of the Z-phase pulse. FIG. 6A shows the output of the free run counter 7. If the difference between the current and the preceding latched values of the latch counter 21 produced from the subtraction circuit 21a is referred to as an increment pulse of the latch counter 21, it is evident that the absolute value of the incremental pulse of the latch counter 21 is equal to the number of pulses per rotation of the position detector 6 in the case where the servo motor 5 rotates in one direction and when a new Z-phase pulse is applied. In the case where the servo motor 5 rotates reversely midway during rotation in the one direction to thereby return to the original position, the incremental pulse becomes zero. The abnormality detection circuit 22, therefore, makes judgment as to whether or not the absolute value of the quantity of the increment pulse is within a permissible range, so that the abnormality detection circuit 22 supplies a signal representing an abnormality to the pulse distribution circuit 2 when the absolute value of the quantity of the increment pulse exceeds the permissible range. Thus, in response to the detection abnormality signal, it is possible to take a measure such as displaying a message on a display of the position control circuit 3 to inform the operator of the occurrence of an abnormality while stopping pulse distribution operation of the pulse distribution circuit 2.

Although an example of the case of erroneous counting in the free run counter 7 in the position control system has been described in the above embodiment, the present invention can be applied to the case of detection of erroneous counting in the cycle counter 8 used to detect a reference point return or used to detect a magnetic pole position when the servo motor 5 is an AC induction motor, or it can be applied to the case of detection of erroneous counting in the free run counter 7 in the speed control system. FIG. 6B shows the operation of the cycle counter 8 which is identical to counter 7 but, is reset upon the output of a Z-phase pulse (FIG. 6C).

Figure 4:
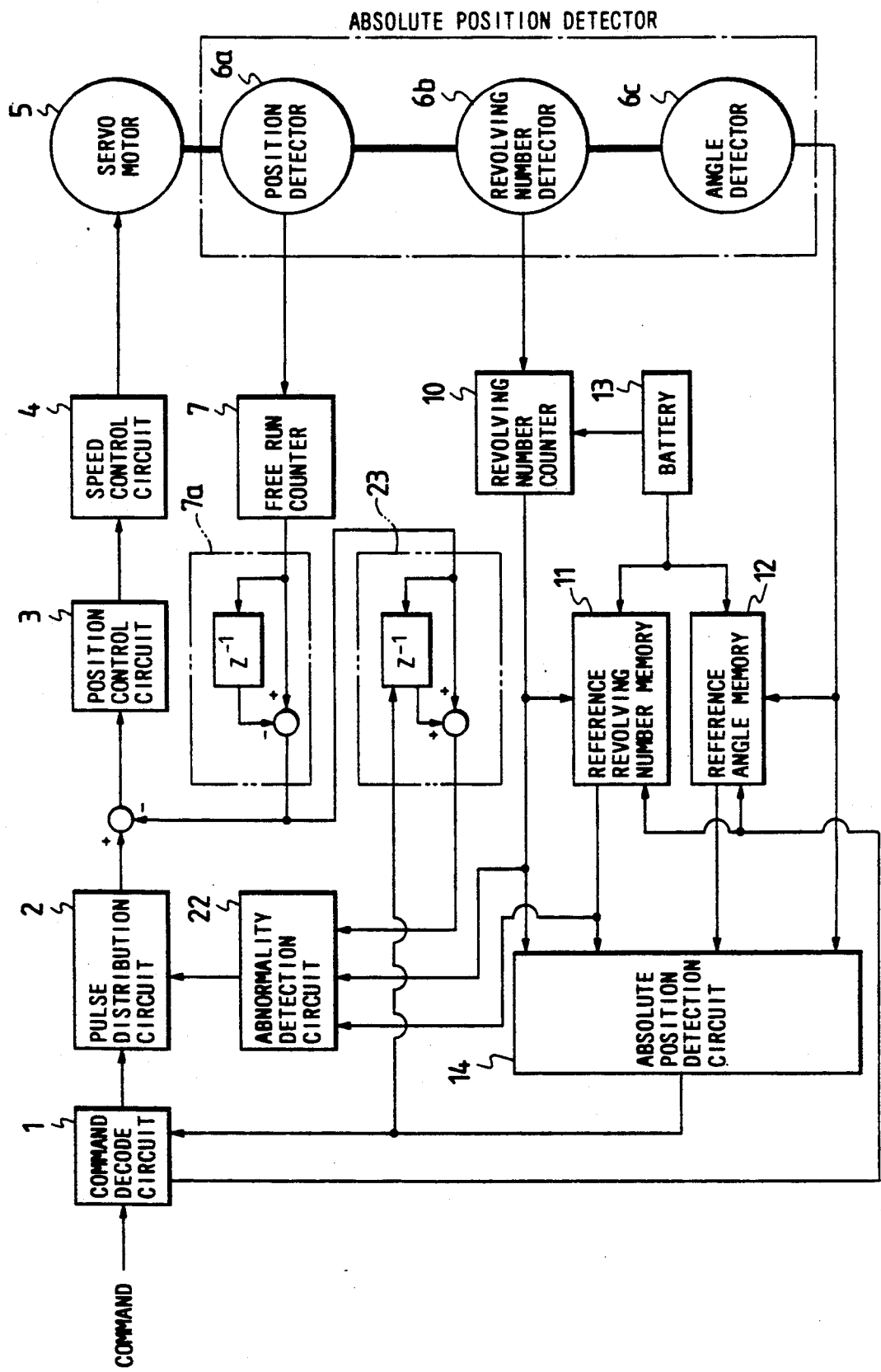
FIG. 4 is a block diagram showing another embodiment of the servo control apparatus according to the present invention.

FIG. 4 is a block diagram showing a second embodiment of the present invention. In FIG. 4, same items in FIG. 2 are designated with the same reference numerals.

Figure 7A:
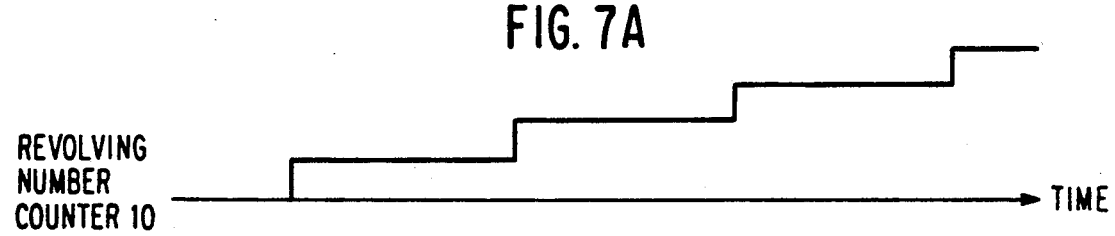
FIG. 7A is a timing diagram of a counter of FIG. 4.

In FIG. 4, the configuration includes, in addition to those designated by the reference numerals in FIG. 2, an accumulation circuit 23 which serves to accumulate a position feedback pulse per unit time of the servo motor 5 calculated in the feedback pulse generation circuit 7a, and an abnormality detection circuit 22 which receives the output of the accumulation circuit 23, the output of the revolving number counter 10 which counts the output pulse of the revolving number detector 6b, and the output of the reference revolving number memory 11 which stores the count value of the revolving number counter 10 at a reference point so that an abnormality of the absolute position of the servo motor 5 is detected. FIG. 7A shows the outputs of revolving number counter 10 which counts up every revolution of the absolute position detector.

Figure 5:
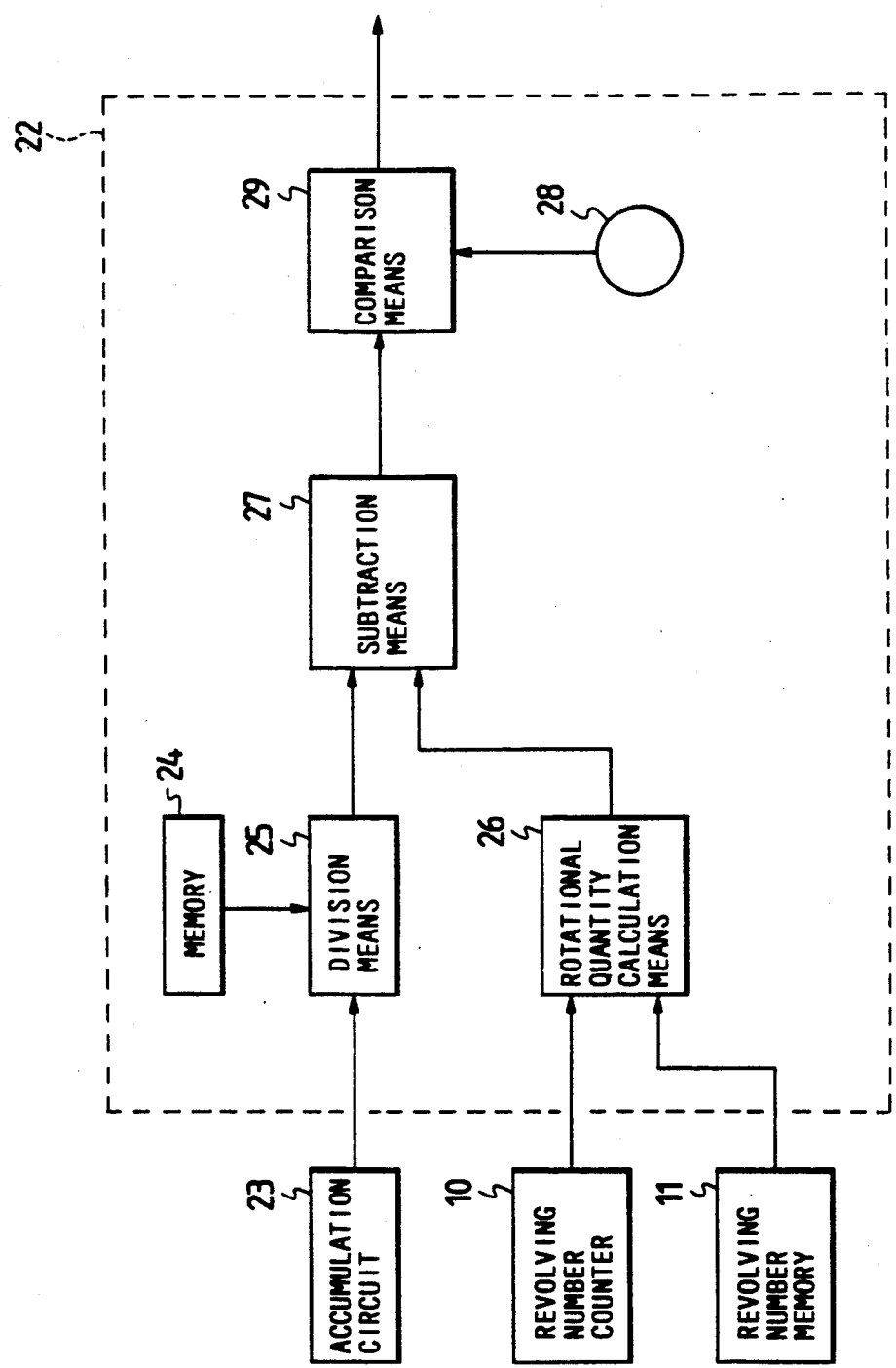
FIG. 5 is a block diagram showing the abnormality detection circuit depicted in the embodiment of FIG. 4.

As shown in FIG. 5, the abnormality detection circuit 22 is constituted by a division means 25, a rotational quantity calculation means 26, a subtraction means 27 and a comparison means 29. The division means 25 serves to divide a cumulative value of the position feedback pulse supplied from the accumulation circuit 23 by the total number of pulses per rotation of the position detector 6a which is set in a memory 24 in advance. The rotational quantity calculation means 26 serves to calculate a difference between a count value of the revolving number counter 10 and a count value of the same at the reference point supplied from the reference revolving number memory 11 to thereby obtain the quantity of rotation of the servo motor 5 from the reference point. The subtraction means 27 serves to subtract the output value of the rotational quantity calculation means 26 from the output value of the division means 25. The comparison means 29 serves to compare the output value of the subtraction means 27 with a predetermined permissible value 28.

Next, the operation of the thus configured servo control apparatus will be described.

First, upon turning-on of a power source for the servo control apparatus, the absolute position of the servo motor 5 is detected by the absolute position detection circuit 14 on the basis of the count value of the revolving number counter 10, the number of rotations at the reference point stored in the reference revolving number memory 11, the angle of the servo motor 5 detected by the angle detector 6c, and the angle of the reference point stored in a reference angle memory 12. Next, the accumulated value of the position feedback pulse of the accumulation circuit 23 is preset to the detected absolute position.

When the servo motor 5 is driven in this state so that an output pulse is produced from the position detector 6a, the position feedback pulse accumulated value of the accumulation circuit 23 is successively renewed so as to show the absolute position of the servo motor 5 in the driving state. When the position feedback pulse accumulated value is supplied to the abnormality detection circuit 22 so that the accumulated value is divided by the total number of pulses per rotation of the position detector 6a in the division means 25, the quantity of rotation of the servo motor 5 from the reference point is obtained from the quotient.

Further, the rotational quantity calculation means 26 subtracts the count value in the reference position which is stored in the reference revolving number memory 11 from the count value of the revolving number counter 10 which corresponds to the revolving number detected by the revolving number dector 6b thereby obtain the quantity of rotation of the servo motor 5 from the reference point.

Then, the subtraction means 27 calculates a difference between the thus obtained quantity of rotation and the quantity of rotation of the servo motor 5 on the basis of the output pulse of the position detector 6a transferred from the division means 25. The comparison means 29 compares the difference value between the two quantities of rotation calculated by the subtraction means 27 with the predetermined permissible value 28. If the difference value between the two quantities of rotation exceeds the predetermined value, there exists occurrence an of an error in the output pulse of either the position detector 6a or the revolving number detector 6b, or erroneous counting in the count value of the revolving number counter 10. Accordingly this time, the abnormality detection circuit 22 supplies an absolute position detection abnormality signal to the pulse distribution circuit 2. Upon reception of the absolute position detection abnormality signal, the pulse distribution circuit 2 stops outputting the command pulse which has been supplied to the position control circuit 3 to thereby stop driving the servo motor 5.

The above embodiment has been described as to the case where the reference revolving number memory 11 and the reference angle memory 12 are provided. If the revolving number counter is preset at the time of setting the reference point so that the reference angle is fixed to a predetermined value, however, the same effect as that obtained in the above embodiment can be obtained.

As described above, according to the present invention, the control system is configured such that the latch counter which serves to latch erroneous counting of the feedback pulse from the position detector for detection of the position of the servo motor which is an object to be controlled in accordance with the reference pulse from the position detector and the abnormality detection circuit which serves to judge whether or not the erroneous counting is within a predetermined permissible value on the basis of the output of the latch counter are provided so that the control system can immediately cope with the abnormal state of the servo motor upon occurrence of such an abnormal state. Accordingly, the reliability is improved to thereby obtain a high-accurate servo control apparatus.

Further, in the second embodiment of the present invention, the quantity of rotation of the servo motor obtained from the output pulse of the position detector is compared with the quantity of rotation of the same obtained from the output pulse of the revolving number detector, so that when the difference between both the quantities of rotation exceeds a predetermined permissible range, the state is determined to be an abnormality so that the driving of the servo motor is stopped. With a simple configuration, therefore, a maloperation of the absolute position detector can be detected so that a maloperation of the servo motor can be prevented to thereby improve the reliability of the servo control apparatus.

What is claimed is:

1. A servo control apparatus comprising:
   a servo motor;
   a position detector for providing feedback pulses corresponding to a rotational position of said servo motor, said position detector additionally providing a reference signal when said servo motor rotates to a predetermined position;
   a free run counter for counting the feedback pulses from said position detector;
   a latch counter for latching an output of said free run counter in response to said reference signal; and
   an abnormality detection means for calculating an absolute difference between a current and a preceding output of said latch counter, said abnormality detection circuit comparing the calculated absolute difference with a predetermined value, and providing an abnormality signal indicating that an abnormality exists when the comparison exceeds a predetermined value.

2. The servo control apparatus as defined in claim 1, wherein said abnormality detection means includes a first circuit for storing the preceding output of said latch counter, and a second circuit for subtracting the stored preceding latch counter output from a current latch counter output.

3. The servo control apparatus as defined in claim 1, further comprising a pulse distribution circuit for generating a command signal for said servo motor.

4. The servo control apparatus as defined in claim 3, wherein said pulse distribution circuit is connected to receive the abnormality signal from said abnormality detection means.

5. A servo control apparatus comprising:
a position detector for detecting a rotational position of a servo motor;
counting means for counting output pulses from said position detector;
a subtraction circuit for obtaining a difference between a current and a preceding counted output from said counting means;
a revolving number detector for detecting a rotational position of said servo motor;
a revolving number counter for counting output pulses from said revolving number detector;
an accumulation circuit for accumulating outputs from said subtraction circuit; and
an abnormality detection circuit for providing a first signal representing a quantity of rotation of said servo motor from a reference point, and a second signal representing the quantity of rotation of said servo motor from the reference point, said first signal being provided in accordance with the output of said accumulation circuit, and said second signal being provided in accordance with the output of said revolving number counter, said abnormality detection circuit also providing a third signal representing an abnormality when a difference between said first and second signals exceeds a predetermined value.

6. The servo control apparatus as defined in claim 5 further comprising a revolving number memory for storing a value of said revolving number counter at the reference point, and wherein said abnormality detection circuit further comprises memory means for storing a value representing a total number of pulses per rotation of said position detector, division means for dividing the output of said accumulation circuit by said value stored in said memory means thereby providing the first signal, a rotational quantity calculation means, coupled to received outputs from said revolving number counter and said revolving number memory, for providing the second signal, subtraction means for subtracting the first and second signals, and comparison means for comparing an output of said subtraction means with a predetermined value.

* * * * *